(12) United States Patent
Griffin

(10) Patent No.: US 8,332,314 B2
(45) Date of Patent: Dec. 11, 2012

(54) TEXT AUTHORIZATION FOR MOBILE PAYMENTS

(76) Inventor: Kent Griffin, Mountain View, CA (US)

( * ) Notice: Subject to any disclaimer, the term of this patent is extended or adjusted under 35 U.S.C. 154(b) by 442 days.

(21) Appl. No.: 12/272,216

(22) Filed: Nov. 17, 2008

(65) Prior Publication Data

US 2010/0114775 A1    May 6, 2010

Related U.S. Application Data

(60) Provisional application No. 61/111,601, filed on Nov. 5, 2008.

(51) Int. Cl.
*G06Q 40/00* (2006.01)
(52) U.S. Cl. ............... 705/39; 705/37; 705/40; 705/44; 705/67; 455/466; 235/379
(58) Field of Classification Search ............ 705/34, 705/44, 67, 39–40; 455/466; 235/379
See application file for complete search history.

(56) References Cited

U.S. PATENT DOCUMENTS

| | | | |
|---|---|---|---|
| 3,145,021 A | 8/1964 | Anderson | |
| 3,507,774 A | 4/1970 | Muly, Jr. | |
| 4,270,136 A | 5/1981 | Toyokura et al. | |
| 4,385,979 A | 5/1983 | Pierce et al. | |
| 7,526,448 B2* | 4/2009 | Zielke et al. | 705/40 |
| 2002/0032653 A1* | 3/2002 | Schutzer | 705/40 |
| 2004/0038033 A1 | 2/2004 | Massler et al. | |
| 2007/0078760 A1* | 4/2007 | Conaty et al. | 705/39 |
| 2007/0162387 A1* | 7/2007 | Cataline et al. | 705/40 |
| 2007/0203836 A1* | 8/2007 | Dodin | 705/44 |
| 2008/0091619 A1* | 4/2008 | Perlman et al. | 705/76 |
| 2008/0294556 A1* | 11/2008 | Anderson | 705/44 |
| 2009/0119190 A1* | 5/2009 | Realini | 705/30 |

FOREIGN PATENT DOCUMENTS

| | | |
|---|---|---|
| DE | 100 18 143 A1 | 10/2001 |
| JP | 02007179454 A * | 12/2005 |

OTHER PUBLICATIONS

Patent Abstracts of Japan, Sakamoto Akihisa, "Semiconductor Processing Apparatus and Method for Its Use", Publication No. 2000-332002, Publication Date Nov. 30, 2000, 1 page.

* cited by examiner

*Primary Examiner* — Harish T. Dass

(74) *Attorney, Agent, or Firm* — Haynes and Boone, LLP

(57) ABSTRACT

A system and method enables trusted sources to easily approve requests for money transfers by simply typing in a yes or equivalent.

22 Claims, 4 Drawing Sheets

TEXT AUTHORIZATION FOR MOBILE PAYMENTS

RELATED APPLICATIONS

This application claims benefit of U.S. Provisional Application No. 61/111,601, filed Nov. 5, 2008, the entire disclosure of which is incorporated herein by reference.

BACKGROUND

1. Field of the Invention

The present invention generally relates to financial transactions and more particularly to facilitating mobile on-line financial transactions through an on-line payment provider.

2. Related Art

With the ever-increasing popularity of the Internet and of Internet commerce, both consumers and sellers are using the Internet to facilitate financial transactions between parties, whether they be individuals or companies. In on-line financial transactions, consumers may use third-party payment service providers to transfer money through electronic communications with others over electronic networks, such as the Internet. The money transfer may be for payment of goods or services or between family members and friends. The third-party payment providers provide an infra-structure, software, and services that enable users to make and receive payments. The payments may be credit card payments, electronic bank transfers, or other payment techniques offered by the third-party payment provider. One payment technique may be transferring money from an account held by the payment provider, as opposed to transferring credit from an outside credit card company or an outside financial institution or bank. Transferring money held in the payment provider account may be cheaper for a user because it avoids certain transaction fees or interest payments that may be incurred when transferring money or making a payment from an outside credit or banking institution.

When one user desires to transfer money to another user, there is typically a series of requests and confirmations, including entering personal identification numbers (PINs), that one or both users must perform. This ensures that money is not fraudulently or mistakenly transferred from one account or user to another. However, requiring users to go through such a series of actions may be cumbersome and time-consuming. This can be especially true with users that are performing the transactions via mobile devices due to factors such as smaller keypads, time delays, and less stability of the device when compared with desktop devices. With increased use and proliferation of mobile devices in Internet commerce, there is a need for a simple, yet secure, method to perform financial transactions between users using mobile and other computing devices.

SUMMARY

According to one embodiment, a user (payer) sends text message via Short Message Service (SMS) on the payer's mobile device to initiate a money transfer. The text message may simply identify the dollar amount and the recipient, such as a name, phone number, or email. If the recipient identifier is known to the payment provider as a "trusted" source, such as someone previously identified as such by the payer to the payment provider or someone who the payer has previously sent money to, the payment provider responds with a text message to the payer asking whether the specified dollar amount should be sent to the recipient. The payer can then simply type "yes" or "y" to confirm and make the payment. If the recipient is not a "trusted" recipient, the payment provider asks the payer to other authorize the transaction through a shared secret (password or PIN). For example, the payment provider could contact the recipient to ask for a PIN, which it verifies first before sending the payment. The payment provider may then ask the payer if the payer wants to add the recipient as a "trusted" source for future payments.

According to another embodiment, a user (recipient), such as a child, asks their parent (payer) for money via SMS, e.g., by typing "get 10," "get 10 from mom," "get 10 from dad," or "get 10 from [phone number of parent]." Based on the child's phone number, the payment provider determines if the parent is a trusted source for quick approvals. (Family members may be assumed as trusted until otherwise indicated). If so, the payment provider sends a text message to the parent, asking for approval of the requested transfer from the child. The parent can then simply type a "yes" or "y" to initiate the transaction. The requested amount (e.g., $10) is then transferred form the parent's account to the child's account. The parent and/or child may be notified via text that the transfer has been completed. If the parent denies the request by typing a "no" or "n," the payment provider notifies the child and/or parent that the request has been canceled. If the parent is not part of the payment provider system as a trusted source for quick approvals, the payment provider can text or email the parent and obtain desired information such as a PIN. The parent can then be asked whether they want to be in the child's trusted source for quick approvals.

These type of quick approvals (simply typing "yes," "y," or "9" (shortcut for "y") for money transfers enables users to more quickly and easily effect money transfers between trusted sources, such as parent and child, with minimal risks of fraudulent transfers.

These and other features and advantages of the present invention will be more readily apparent from the detailed description of the embodiments set forth below taken in conjunction with the accompanying drawings.

Figure 1:
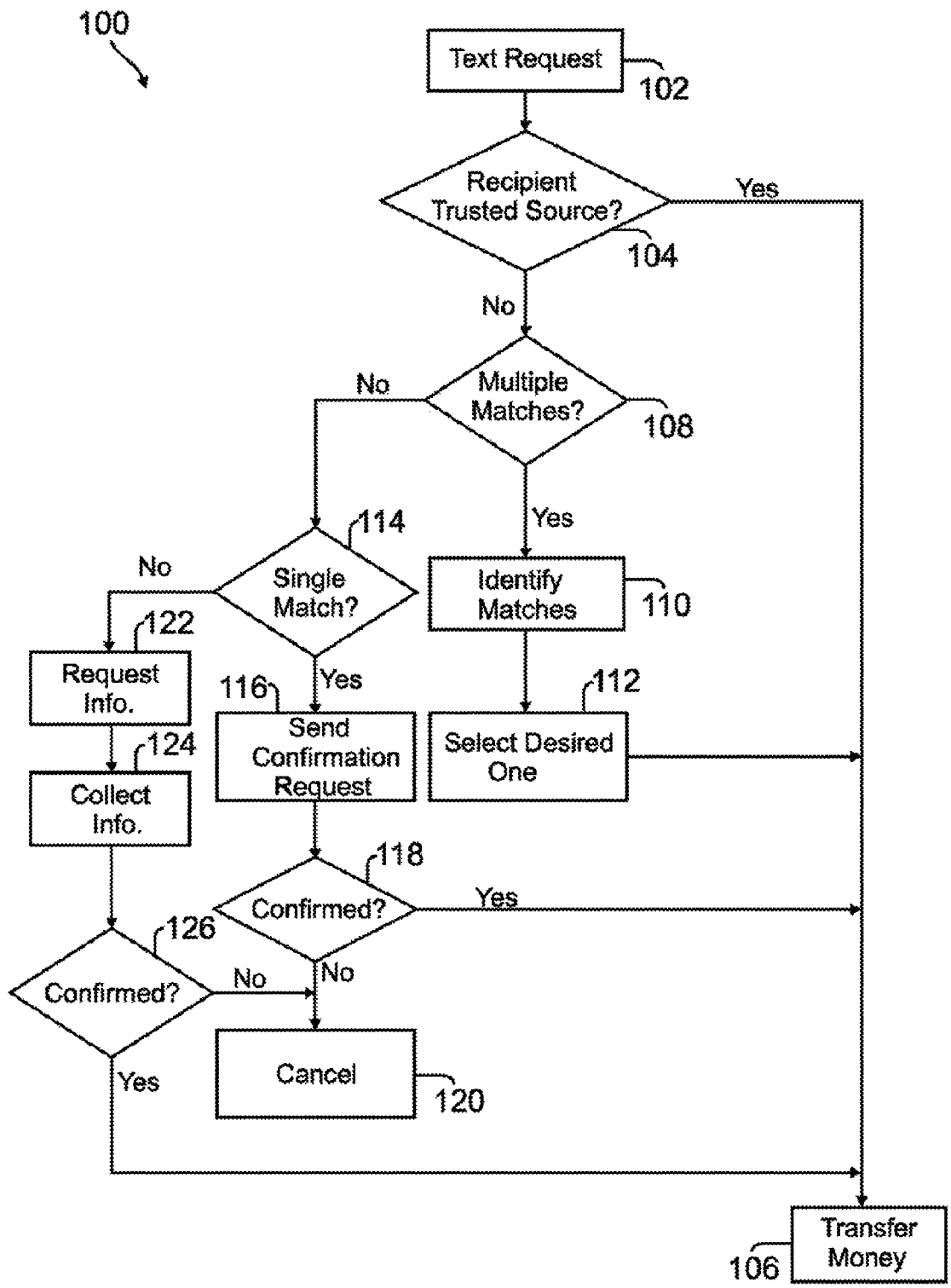
FIG. 1 is a flowchart showing steps used to facilitate a text authorization for an on-line financial transaction according to one embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

FIG. 1 is a flowchart 100 showing one embodiment of using text authorization to facilitate an on-line financial transaction, such as a money transfer, using mobile devices, where the payer initiates the request. In step 102, a user (payer) sends a text message to a payment provider, such as PayPal, Inc., from his computing device, such as a mobile phone, using SMS. The text may simply be "send 10 to Matt." The payment provider determines, at step 104, whether "Matt" is in the payer's "trusted" list, which identifies people/merchants that the payer has designated as ones that do not require authentication, such as a PIN, for an on-line money transfer. Note that "trusted" list or source is defined, in one embodiment, as people/merchants identified by either a payer or a recipient as ones that can be approved for a money transfer without requiring a PIN, and typically, only require an identification or confirmation for the transfer to be made. The payer may initially identify these trusted sources to the payment provider, such as with name, phone number, and/or email. The payer may also add, drop, or edit trusted sources at any time by contacting the payment provider. If "Matt" is uniquely identified as a trusted source in step 104, the payment provider transfers the requested amount (in this case $10) from the payer's account to Matt's account in step 106. A notification may be sent from the payment provider to the payer and/or the recipient.

If the intended recipient is not uniquely identified as a trusted source of the payer (e.g., when there are multiple matches or ambiguity with the intended recipient's information), the payment provider determines if there are multiple matches for the intended recipient in step 108. For example, the payer's trusted source list may include multiple "Matt" names, "Matthew", "matt" within a name, such as "Jody Smatter," or any other possible matches with "matt." Other ambiguities or matches may occur with other recipient designations, such as email, etc. The multiple matches may be from the payer's trusted source list or simply from people that the payer has conducted transactions with over a given period of time (e.g., 1 year). If there are multiple matches, then the payment provider compiles the list of matches and transmits that list to the payer at step 110. For example, the payer may be provided, at his mobile device, a list of several possible matches for Matt, each corresponding to a number. The payer then determines which one is the intended recipient and selects the desired one in step 112. The selection can be simply replying to the payment provider and typing in the appropriate number, such as "2" for "Matt Jones." If none of the selections is the one the payer wants, the payer can reply with contact information, such as a phone number for the intended recipient. The payment provider can then call that number to obtain desired information. Once the proper and correct recipient is identified, the payment provider transfers the requested money amount from the payer's account to the account of the intended recipient. Notifications may be sent to the payer and/or the recipient after transfer. If the recipient was not in the payer's trusted source, the payment provider can send a request to the payer to add the recipient to the list for future quick approval transactions.

If, as determined in step 108, there are not multiple matches for the intended recipient, the payment provider determines, at step 114, whether there is a single match from sources who the payer has conducted transactions with over a certain period of time, such as one year. If there is a match, e.g., the payer conducted one or more transactions with "Matt" over the past year, but "Matt" is not in the payer's trusted source list, the payment provider sends a text message to the payer, in step 116, asking the payer to confirm the transaction. The text message may be "send 10 to Matt Jones." The payer, at step 118, can then confirm, deny, or reply with a different phone number. If confirmed, such as by typing in a "yes," "y," or "9," the payment provider transfer the requested amount in step 106 to Matt Jones. The payment provider can send a message to the payer asking whether Matt Jones is to be added to the payer's trusted source list. If, as determined in step 118, the payer denies the request, such as by typing "no", "n," or "6," the transaction is canceled at step 120.

If, as determined in step 114, the payer's intended recipient does not match anything in the payment provider's system for the payer, the payment provider sends a text message to the payer asking for additional information about the recipient, in step 122. A "no" match may result from the payer never having conducted any transactions with the recipient, the payer mis-typing the recipient's information, or the payer not having conducted any transactions with the recipient within a certain period of time, such as 3 years. The request for information in step 122 may include asking the payer for an email or phone number for the intended recipient. The payer enters and transmits the requested information, which the payment provider uses to uniquely identify the intended recipient. Since the recipient is not yet a trusted recipient for this sender, the payment provider then asks the payer for an authorization of the transaction through a shared secret (PIN or password). This may include calling the payer by IVR (Interactive Voice Response) or sending a link to the payer via SMS to collect the credentials online. If confirmed, the requested funds are transferred, and the payer can be asked whether the recipient is to be added to the trusted source list. If denied, the transaction is canceled. As with transactions discussed herein, the payment provider may send a notice to the payer and/or the recipient that the requested funds have been transferred. In other embodiments, the payer and/or the recipient can request the payment provider call them for various steps discussed herein if security is an issue. This can be done, for example, by the payer/recipient sending a "1" as a reply to a request for a call-back.

Figure 2:
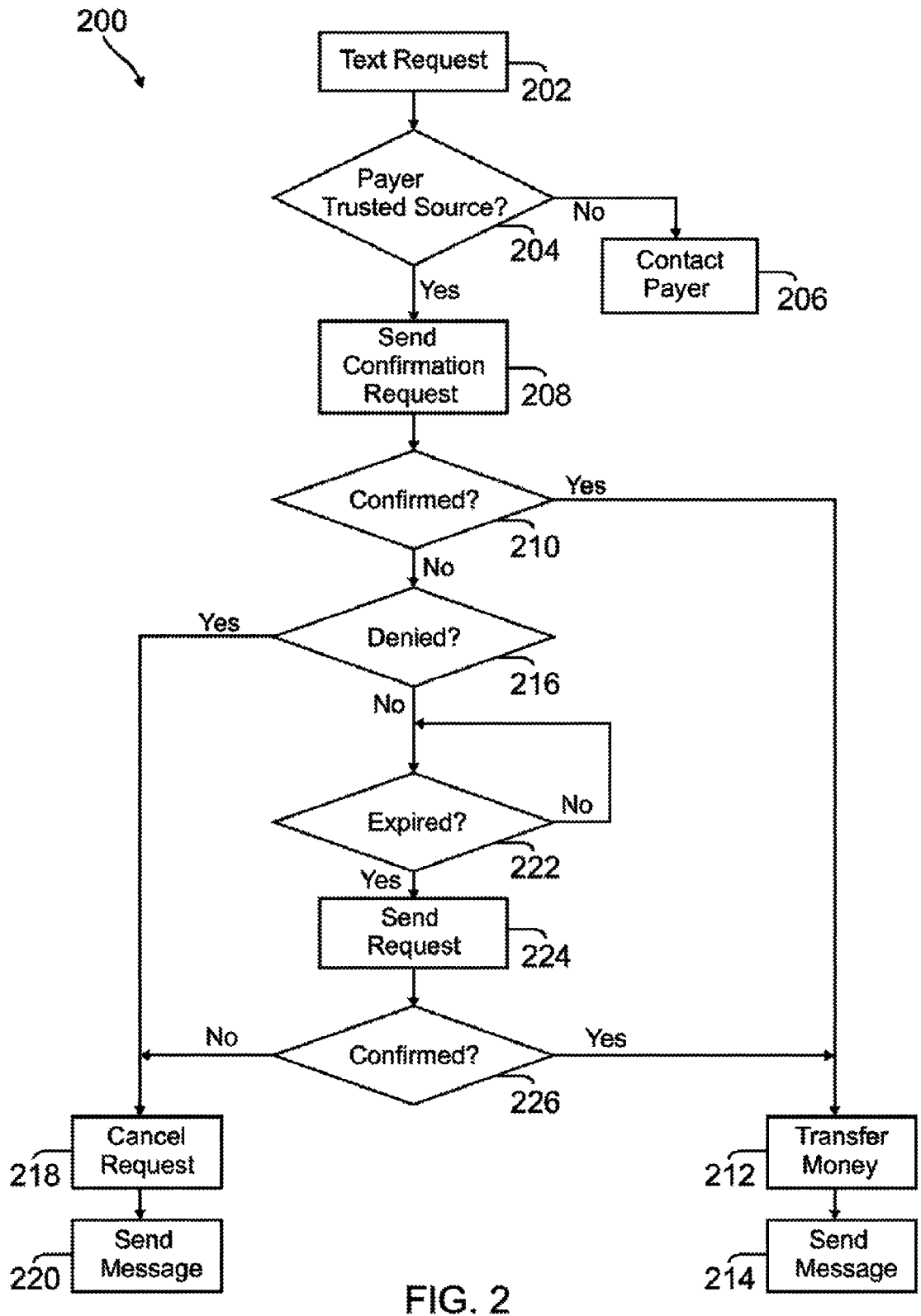
FIG. 2 is a flowchart showing steps used to facilitate a text authorization for an on-line financial transaction according to another embodiment.

FIG. 2 is a flowchart 200 showing another embodiment of using text authorization to facilitate an on-line financial transaction, such as a money transfer, using mobile devices, where a recipient initiates the request. In step 202, a user (recipient) sends a text message to a payment provider, such as PayPal, Inc., from his computing device, such as a mobile phone, using SMS. The user in this example is a child requesting a money transfer from his parent(s), although this embodiment is not limited to a child/parent transaction. The text message may be "get 10," "get 10 from [parent's phone number]," "get 10 from dad," or "get 10 from mom." The payment provider, at step 204, determines whether the recipient has a trusted source for quick approval. If the child's phone number is associated with only one trusted source, then a "get 10" message would simply require the payment provider to check if the child has a trusted source. If there is not enough information in the request or if the payer is not in the child's trusted source, the payment provider sends a message for additional information in step 206. When there is insufficient information, the payment provider may send a message to the child asking for additional information, such as a name or phone number of the payer. When there is not a match, the payment provider may contact the payer, such as by email, text, or call, to obtain additional information. The payer may be asked for account information and whether the payer wants to be added to the child's trusted source list for quick approvals of money requests. The payment provider may also send a text message to the child informing the child that the parent has been notified, but they are not yet on the quick approval list or have not turned on this feature. Depending on the actions, the payment provider may then make the requested money transfer or cancel the transaction, notifying one or both parties if desired.

If, as determined in step 204, the payer is a trusted source, the payment provider sends a confirmation request to the payer (e.g, parent) in step 208. The request may be an SMS message such as "transfer 10 to son" or "transfer 10 to [phone number of child]." The payer then replies with a "y" or equivalent to confirm the request. If the request for transfer is confirmed, as determined in step 210, the payment provider transfer the specified amount from the payer's account or other designated account to the recipient's account in step 212. The payment provider, at step 214, may then send the payer and/or the recipient a message indicating that the funds have been sent. If the request for transfer is not confirmed at step 210, the payment provider determines whether the request was actually denied or just not responded to at step 216. If the former, the money transfer request is canceled in step 218, and a message may be sent by the payment provider to the requestor (intended recipient) and/or the intended payer in step 220 that the request has been denied and canceled by the payer.

If the confirmation has not been confirmed or denied, the payer may simply have not responded to the request. If that is the case, as determined at step 216, the payment provider determines whether the request has expired at step 222. Expiration may be when a response (confirm or deny) has not been received for a given period of time, such as one day or one week. Note that one possible requirement (of this embodiment) of the payment provider is that only one request can be pending or processed at a time. For example, if a first request for money is made without a response by the payer and then a second request is made while the first request is still pending (i.e., not expired or acted upon (confirmed or denied)), the payment provider may send a message to the requestor in response to the second request. The message may be that the first request is still pending and that the second request will not be transmitted or accepted until the first request has expired or been responded to. The message may also ask the requester if the requester desires to cancel the first request, cancel the second request, or cancel both requests and send a new request. In other embodiments, multiple requests could be handled at the same time but the payee (parent) would need to specify which payment to complete. For example, when replying with "y," the parent would need to be more specific and specify which transaction should be completed. This could be done through a text such as "y first."

If a request has expired, the payment provider sends a message, in step 224, to the payer, such as a reminder. In one example, the payment provider sends the payer a text message asking the payer if the payer wants to send the requested amount to the initial requester (e.g., the child). The payer can confirm with a "yes" or equivalent to create the new payment. Alternatively, the payer can be asked to forward the message to the payment provider to create the new payment request. If confirmed, as determined in step 226, the payment provider transfers the requested amount in step 212 and sends a message to the payer and/or recipient in step 214. If the request is not confirmed (e.g., by another non-response or an actual denial), the payment provider cancels the request in step 218 and sends a message to the payer and/or recipient in step 220. Another option for response is that the payer (parent in this case) may respond with an affirmation of the transaction but for a lower amount. For example, the parent may reply to the request with "yes 10" to only authorize ten dollars instead of the original requested amount.

In various embodiments, the payment provider may offer the recipient or payer different options. For example, the payer or parent may have a profile-level setting that allows them to choose whether the quick-approval feature is turned off or on. The feature may be selectively turned on for specific recipients. A limit on the amount a payer can approve through this text process can be set, such as no more than $50 each day, or no more than $100 each week, or no more than $300 each month. When limits are met, the payment provider may send a text message to the requestor and/or the payer. In different embodiments, the payer may be given the option of bypassing the pre-set credit limit, either only for the current transaction or modifying the limit for future requests.

Figure 3:
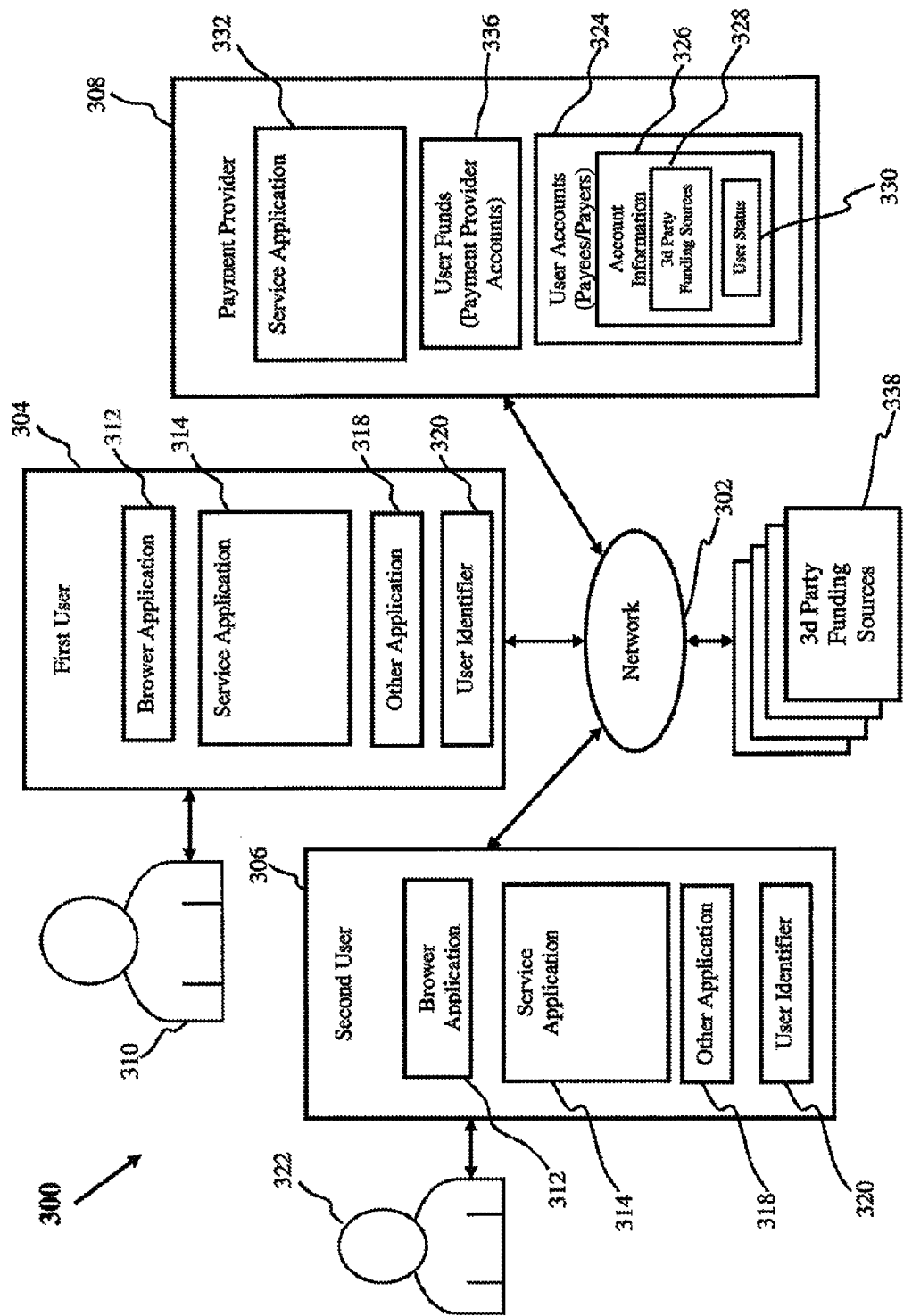
FIG. 3 is a block diagram of a system used for facilitating an on-line account according to one embodiment.

FIG. 3 shows one embodiment of a block diagram of a system 300 configured to facilitate financial transactions over a network 302 to perform the steps described above with respect to FIGS. 1 and 2. As shown in FIG. 3, system 300 includes at least one first user device 304, one second user device 306, and at least one payment provider server 308 in communication over network 302. In one embodiment, network 302 may be implemented as a single network or a combination of multiple networks. For example, network 302 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

In one embodiment, first user device 304 may be implemented using any appropriate combination of hardware and/or software configured for wired and/or wireless communication over network 302. For example, first user device 304 may be implemented as a computing device of a first user 310 in communication with network 302, such as a wireless telephone (e.g., cell phone), personal digital assistant (PDA), notebook computer, and/or various other generally known types of computing devices. First user device 304 may include one or more browser applications 312 which may be used, for example, to provide a user interface to permit the first user 310 to browse information available over network 302. For example, browser application 312 may be implemented as a web browser to view information available over the Internet or access a payment provider site or account.

First user device 304 may also include a service application 314 for facilitating financial transactions on network 302. In an example embodiment, the service application 314 comprises a software program or programs, such as a graphical user interface (GUI), executable by a processor that is configured to interface and communicate with a second user 322 and with payment provider server 308 via network 302. In an example embodiment, the service application may be resident on the user device or accessed by a user through network 302. First user 310 may initiate a request for money from second user 322 or a request to transfer money to second user 322 through payment provider server 308 through applications on first user device 304.

In an example embodiment, service application 314 may be accessed using a protocol such as a WSDL (web services definitional language), SOAP (simple object access protocol), API (application program interface), or the like. The applications may be initiated from a remote call procedure from an API or other protocol. The remote calls may be initiated from a program resident on the user device or from a third-party platform or website, for example a social networking site such as FACEBOOK, MYSPACE or any other website that may feature access to a payment provider service application.

When installed on or accessed by first user device 304 and run from first user device 304, service application 314 is configured to provide and display payment services mechanism or mechanisms, such as an image, icon, radio button, dialogue box or other graphical user interface (GUI) on a display component (e.g., monitor) of first user device 304. In general, the GUI represents a program, application, command, link to a web page, etc., wherein first user 310 may select a payment service, shop, conduct other payment processing services. The GUI may include the option of initiating a quick approval for sending or receiving money by taking a certain action, for example by clicking on a related icon, radio button, link or other button or representation using a cursor control component (e.g., mouse) or keyboard. The user may then type in a suitable text message to initiate the quick approval process.

In an example embodiment, in which first user 310 has not yet established an account or user record with payment provider server 308, upon installation of service application 314, first user 310 may be prompted to establish a user account with payment provider server 308, wherein first user 310 may use first user device 304 to access payment provider server 308 via network 302. When establishing a user account, first user 310 may be asked to provide personal information, such as name, address, phone number, user name, e-mail address, password, PIN, etc., and financial information, such as banking information, credit card information, etc.

Payment provider server 308 may create a user account 324 for each user 310. The user account may include account information 326, including third party funding source information 328 used to transfer or receive money, and a user status 330. Third-party funding source information 328 may include the identity of sources, routing numbers, account numbers and the like. Information related to the availability of funds and/or credit may be stored as part of a user status.

First user device 304 may include other applications 318 as may be desired in particular embodiments to provide additional features available to first user 310. For example, such other applications 318 may include security applications for implementing consumer-side security features, programmatic user applications for interfacing with an appropriate protocol such as WSDL, SOAP or API or the like over network 302 or various other types of generally known programs and/or applications.

First user device 304 may also include one or more user identifiers 320, which may be implemented, for example, as operating system registry entries, cookies associated with browser application 312, identifiers associated with hardware of first user device 304, or various other appropriate identifiers. User identifier 320 may include attributes related to the user, such as personal information (e.g., a user name, password, photograph image, biometric ID, address, phone number, etc.) and banking information (e.g., banking institution, credit card issuer, user account numbers, security information, etc.). In various implementations, user identifier 320 may be passed with a request to transfer or receive funds executed by payment provider server 308, and user identifier 320 may be used by payment provider server 308 to associate first user 310 with a particular user account 324 maintained by payment provider server 308.

In one embodiment, second user device 306 may be similar to first user device 304. It may be owned, operated and maintained, for example, by a financial or payment services provider with user account 324 stored on payment provider server 308. Second user device 306, browser application 312, service application 314, other applications 318, and user identifier 320 may implemented similarly as described above with respect to the first user device. Service application 314 of second user device 306 may also enable the second user to initiate, process, and approve or deny quick-approval transactions discussed above with respect to FIGS. 1 and 2.

Payment provider server 308 may be maintained, for example, by an online payment service provider, such as PayPal, Inc. of San Jose, Calif., which may provide payment processing for online transactions on behalf of first user 310 and second user 322 through their respective devices 304 and 306. In this regard, payment provider server 308 includes one or more service applications 332, which may be configured to interact with the devices 304, 306 over network 302 to facilitate the financial transactions (including requests for money transfers between trusted sources).

Payment provider server 308 may be configured to maintain a plurality of user (first and second users) accounts 324, each of which may include account information 326 associated with individual users, including first user 310 and second user 322 associated with the devices 304, 306, respectively. For example, account information 326 may include information, such as one or more account numbers, passwords, credit card information, banking information, user name, or other types of financial information, which may be used to facilitate online transactions between first user 310 and second user 322. User accounts 324 may include memory in individual seller accounts that stores the shared secret from the seller.

User funds accounts 336 may be maintained by payment provider server 308, which represent funds that are held by the payment provider. The funds in the account may represent funds received in previous transactions and/or funds placed in the account by a user for access through the payment provider services.

Thus, in one embodiment, first user 310 communicates to payment provider server 308 from first user device 304 via network 302, instructing a transfer of funds held in a first user account of user funds 336 of payment provider server 308 to be transferred to the second user or requesting a request of funds held in a second user account of user funds 336 to be transferred to the first user. Funds can be transferred from accounts maintained by payment provider server 308 or from third party funding sources 338, such as linked bank accounts or credit cards. If an instruction or request is confirmed by the simple text authorization discussed herein, payment provider server 308 transfers the designated amount of funds to the appropriate account, held by the first or second user.

Figure 4:
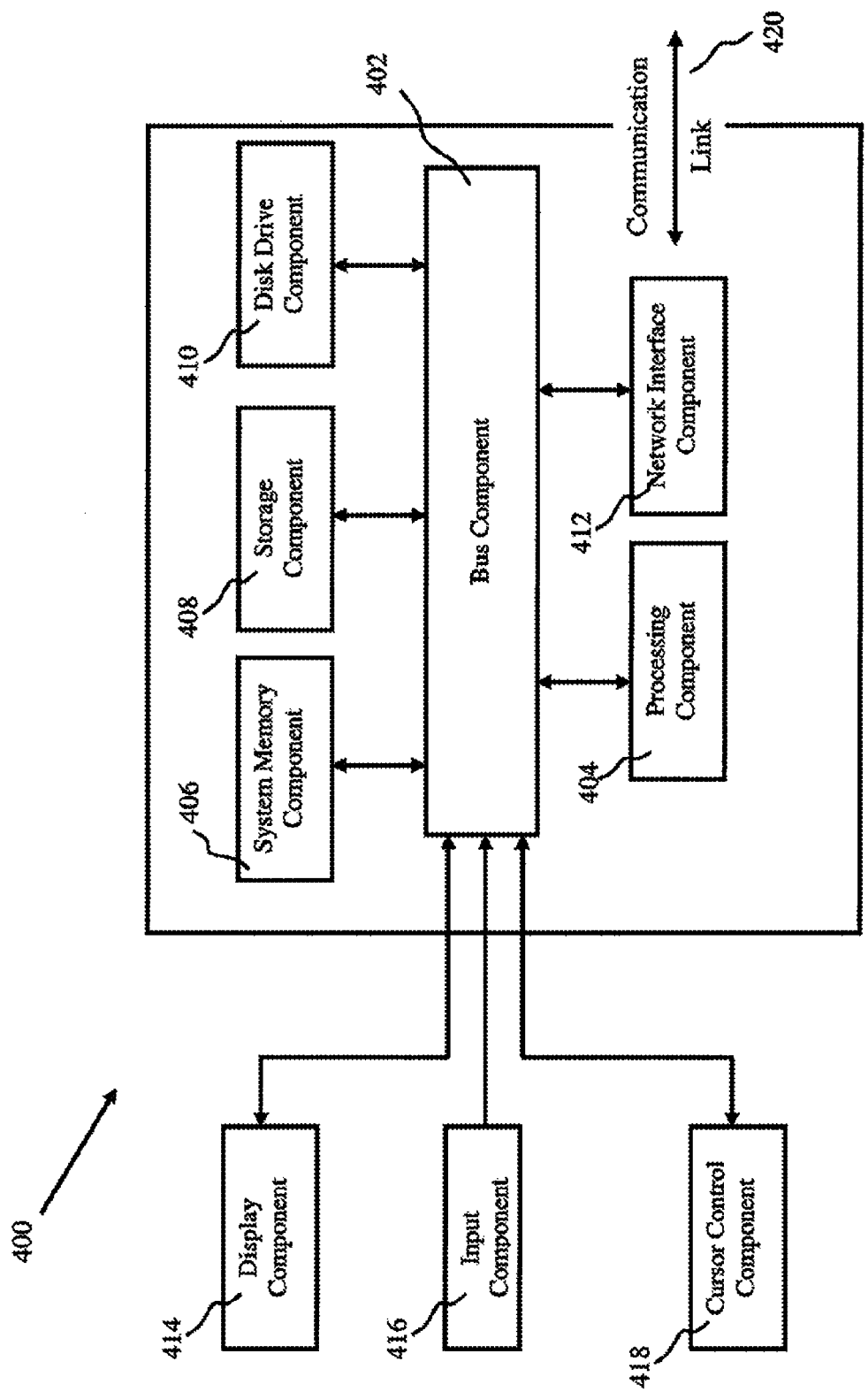
FIG. 4 is a block diagram of one embodiment of a system that can be used to implement one or more components of the system in FIG. 3.

FIG. 4 is a block diagram of a computer system 400 according to one embodiment, which may be suitable for implementing embodiments of various aspects of this disclosure, including, for example, device 304, device 306 and/or payment provider server 308. In various implementations of various embodiments, device 304 and/or device 306 may comprise a personal computing device, such as a personal computer, laptop, PDA, cellular phone or other personal computing or communications devices. Payment provider server 308 may comprise a network computing device, such as one or more servers, computer or processor combined to provide the payment services. Thus, it should be appreciated that devices 304, 306, and/or payment provider server 308 may be implemented as computer system 400 in a manner as follows.

In one embodiment, computer system 400 may include a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 416 (e.g., keyboard or keypad), and/or a cursor control component 418 (e.g., keys, mouse, or trackball). In one embodiment, disk drive component 410 may comprise a database having one or more disk drive components.

Computer system 400 may perform specific operations by processor 404 executing one or more sequences of one or more instructions contained in system memory component 406, according to steps described above with respect to FIGS. 1 and 2. Such instructions may be read into system memory component 406 from another computer readable medium, such as static storage component 408 or disk drive component 410. The various storage or memory components may be used to store information about trusted sources for the quick-approval process. In other embodiments, hard-wired circuitry may be used in place of or in combination with software instructions to implement the invention.

Logic may be encoded in a computer readable medium, which may refer to any medium that participates in providing instructions to processor 404 for execution. Such a medium may take many forms, including but not limited to, non-volatile media, volatile media, and transmission media. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing embodiments of the invention may be performed by computer system 400. In various other embodiments, a plurality of computer systems 400 coupled by communication link 420 (e.g., network 110 of FIG. 1, LAN, WLAN, PTSN, or various other wired or wireless networks) may perform instruction sequences to practice the invention in coordination with one another.

Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus, the invention is limited only by the claims.

What is claimed is:

1. A method of facilitating an on-line transaction, comprising:
  receiving, by a payment provider, a text request from a payer to transfer money to a recipient;
  determining, electronically by a hardware processor of the payment provider, whether the recipient is in a trusted source list associated with the payer;
  sending, by the payment provider, a text confirmation request to the payer based upon a determination that the recipient is not in the trusted source list but the payer previously conducted a money transfer transaction with the recipient;
  receiving, by the payment provider if the text confirmation request was sent, an equivalent yes or no text reply from the payer as to whether to transfer money to the recipient;
  transferring, electronically by the hardware processor of the payment provider, money to the recipient without the need of the sending of the text confirmation request, a PIN, or a password u on a determination that the recipient is in the trusted source list; and
  transferring, electronically the hardware processor of the payment provider, money to the recipient without the need of a PIN or a password upon receiving an equivalent yes text reply from the payer.

2. The method of claim 1, further comprising sending a text message to the payer asking whether to add the recipient to the trusted source list.

3. The method of claim 1, further comprising sending to the payer a list of possible recipients if the recipient is not uniquely identified from the text request.

4. The method of claim 3, further comprising transferring, electronically by the hardware processor of the payment provider, money to the recipient without the need of a PIN or a password upon receiving the identification of the recipient from the payer.

5. The method of claim 1, further comprising sending to the payer a text message requesting identification information of the recipient based upon a determination that the recipient is not in the trusted source list and did not previously conduct a money transfer transaction with the payer.

6. The method of claim 5, further comprising transferring, electronically by the hardware processor of the payment provider, money to the recipient upon receiving credentials and the identification of the recipient from the payer.

7. The method of claim 1, wherein the text request is sent from a mobile device.

8. The method of claim 1, wherein the text confirmation request is sent to a mobile device.

9. The method of claim 1, wherein the text reply is sent from a mobile device.

10. A method of facilitating an on-line transaction, comprising:
- receiving, by a payment provider, a text request from a recipient to transfer money from a payer;
- determining, electronically by a hardware processor of the payment provider, whether the payer is in a trusted source list associated with the recipient;
- sending, by the payment provider, a text confirmation request to the payer based upon a determination that the payer is in the trusted source list;
- receiving, by the payment provider if the text confirmation request was sent, an equivalent yes or no text reply from the payer as to whether to transfer money to the recipient; and
- transferring, electronically by the hardware processor of the payment provider, money to the recipient upon receiving an equivalent yes text reply from the payer without the need of a PIN or a password.

11. The method of claim 10, further comprising determining whether the text confirmation request has expired.

12. The method of claim 11, further comprising sending a reminder text request to the payer if the text confirmation request has not expired and no response from the payer has been received.

13. The method of claim 10, further comprising sending a text message to the payer asking whether to add the payer to the trusted source list associated with the recipient.

14. The method of claim 10, wherein the text request is sent from a mobile device.

15. The method of claim 10, wherein the text confirmation request is sent to a mobile device.

16. The method of claim 10, wherein the text reply is sent from a mobile device.

17. A non-transitory machine-readable medium containing instructions that cause a service provider facilitating financial transactions over a network to perform a method comprising:
- receiving, by a payment provider, a text request from a payer to transfer money to a recipient;
- determining, electronically by a hardware processor of the payment provider, whether the recipient is in a trusted source list associated with the payer;
- sending, by the payment provider, a text confirmation request to the payer based upon a determination that the recipient is not in the trusted source list but the payer previously conducted a money transfer transaction with the recipient;
- receiving, by the payment provider if the text confirmation request was sent, an equivalent yes or no text reply from the payer as to whether to transfer money to the recipient;
- transferring, electronically by the hardware processor of the payment provider, money to the recipient without the need of the sending of the text confirmation request, a PIN, or a password upon a determination that the recipient is in the trusted source list; and
- transferring, electronically by the hardware processor of the payment provider, money to the recipient without the need of a PIN or a password upon receiving an equivalent yes text reply from the payer.

18. The non-transitory machine-readable medium of claim 17, wherein the method further comprises sending a text message to the payer asking whether to add the recipient to the trusted source list.

19. The non-transitory machine-readable medium of claim 17, wherein the method further comprises sending to the payer a list of possible recipients if the recipient is not uniquely identified from the text request.

20. The non-transitory machine-readable medium of claim 17, wherein the method further comprises transferring, electronically by the hardware processor of the payment provider, money to the recipient without the need of a PIN or a password upon receiving the identification of the recipient from the payer.

21. The non-transitory machine-readable medium of claim 17, wherein the method further comprises sending to the payer a text message requesting identification information of the recipient based upon a determination that the recipient is not in the trusted source list and did not previously conduct a money transfer transaction with the payer.

22. The non-transitory machine-readable medium of claim 17, wherein the method further comprises transferring, electronically by the hardware processor of the payment provider, money to the recipient upon receiving credentials and the identification of the recipient from the payer.

* * * * *